(12) United States Patent
Ryu et al.

(10) Patent No.: US 11,893,982 B2
(45) Date of Patent: Feb. 6, 2024

(54) ELECTRONIC APPARATUS AND CONTROLLING METHOD THEREFOR

(71) Applicant: SAMSUNG ELECTRONICS CO., LTD., Suwon-si (KR)

(72) Inventors: Youngjun Ryu, Suwon-si (KR); Jangho Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 17/290,147

(22) PCT Filed: Jul. 10, 2019

(86) PCT No.: PCT/KR2019/008468
§ 371 (c)(1),
(2) Date: Apr. 29, 2021

(87) PCT Pub. No.: WO2020/091187
PCT Pub. Date: May 7, 2020

(65) Prior Publication Data
US 2022/0005467 A1    Jan. 6, 2022

(30) Foreign Application Priority Data

Oct. 31, 2018 (KR) .......................... 10-2018-0131689

(51) Int. Cl.
*G10L 15/19*    (2013.01)
*G06F 40/30*    (2020.01)
(Continued)

(52) U.S. Cl.
CPC .............. *G10L 15/19* (2013.01); *G06F 40/30* (2020.01); *G10L 15/063* (2013.01);
(Continued)

(58) Field of Classification Search
CPC ... G06F 40/30; G10L 15/063; G10L 15/1815; G10L 15/19; G10L 15/22; G10L 2015/223
See application file for complete search history.

(56) References Cited

U.S. PATENT DOCUMENTS 10,832,005 B1 *  11/2020  Mohajer ................. G10L 25/87
11,004,448 B2    5/2021   Qian et al.
(Continued)

FOREIGN PATENT DOCUMENTS

CN    107679033 A       2/2018
EP    0 242 743 A1     10/1987
(Continued)

OTHER PUBLICATIONS

International Search Report (PCT/ISA/210) issued by the International Searching Authority in International Application No. PCT/KR2019/008468, dated Oct. 17, 2019.
(Continued)

*Primary Examiner* — Eric Yen
(74) *Attorney, Agent, or Firm* — Sughrue Mion, PLLC

(57) ABSTRACT

In the present disclosure, provided are an electronic apparatus and a controlling method therefor. The electronic apparatus of the present disclosure comprises: a memory in which a first model and a second model are stored; and a processor configured to, when user voice is received, generate a response to the user voice according to completion of the received user voice, the completion being determined on the basis of the first model and the second model. Here, the first model uses, as training data, sentence structures of a plurality of completed sentences, and the second model uses, as training data, a plurality of completed sentences and intents corresponding to the plurality of completed sentences. In particular, the first model and the second model may be artificial intelligence models trained according to at
(Continued)

least one of machine learning, a neural network, or a deep learning algorithm.

15 Claims, 9 Drawing Sheets

(51) Int. Cl.
  *G10L 15/06* (2013.01)
  *G10L 15/18* (2013.01)
  *G10L 15/22* (2006.01)
(52) U.S. Cl.
  CPC .......... *G10L 15/1815* (2013.01); *G10L 15/22* (2013.01); *G10L 2015/223* (2013.01)

(56) References Cited

U.S. PATENT DOCUMENTS

| | | | |
|---|---|---|---|
| 2009/0076814 | A1 | 3/2009 | Lee |
| 2013/0325475 | A1 | 12/2013 | Chung et al. |
| 2015/0205779 | A1 | 7/2015 | Bak et al. |
| 2016/0104484 | A1 | 4/2016 | Chakladar et al. |
| 2017/0069308 | A1 | 3/2017 | Aleksic et al. |
| 2017/0256257 | A1* | 9/2017 | Froelich ................. G10L 15/22 |
| 2018/0075841 | A1* | 3/2018 | Shamir .................. G10L 25/87 |
| 2018/0090127 | A1 | 3/2018 | Hofer et al. |
| 2018/0190269 | A1* | 7/2018 | Lokeswarappa ....... G09B 19/06 |
| 2019/0080683 | A1 | 3/2019 | Qian et al. |
| 2019/0214002 | A1* | 7/2019 | Park ........................ G10L 15/30 |
| 2019/0378493 | A1 | 12/2019 | Kim et al. |
| 2020/0090652 | A1* | 3/2020 | Hwang .................. G06F 3/167 |
| 2020/0285699 | A1* | 9/2020 | Nogima ................ G10L 15/063 |

FOREIGN PATENT DOCUMENTS

| | | |
|---|---|---|
| EP | 0527650 A2 | 2/1993 |
| JP | 2004-226505 A | 8/2004 |
| JP | 4425055 B2 | 3/2010 |
| JP | 2011-248140 A | 12/2011 |
| KR | 10-0930584 B1 | 12/2009 |
| KR | 10-2012-0132337 A | 12/2012 |
| KR | 10-1235694 B1 | 3/2013 |
| KR | 10-2013-0134620 A | 12/2013 |
| KR | 10-2015-0015703 A | 2/2015 |
| KR | 10-2017-0071564 A | 6/2017 |
| KR | 10-2018-0084394 A | 7/2018 |
| WO | 2008/128423 A1 | 10/2008 |

OTHER PUBLICATIONS

Written Opinion (PCT/ISA/237) issued by the International Searching Authority in International Application No. PCT/KR2019/008468, dated Oct. 17, 2019.

Liu, et al., "Joint Online Spoken Language Understanding and Language Modeling with Recurrent Neural Networks", 2016, Cornell University Library, XP 080724512, 9 pages total.

Shivakumar, et al., "RNN Based Incremental Online Spoken Language Understanding", 2021, IEEE Spoken Language Technology Workshop, XP 033891451, 8 pages total.

Communication dated Oct. 19, 2021 by the European Patent Office in European Patent Application No. 19879515.5.

Communication dated Oct. 18, 2023 by the China National Intellectual Property Administration in Chinese Patent Application No. 201980070239.7.

"Research on Speech Control Technology Based on Semantic Comprehension", Nov. 15, 2017. (61 pages total).

Korpusik, Mandy et al., "Spoken Language Understanding for a Nutrition Dialogue System", IEEE/ACM Transactions on Audio, Speech, and Language Processing, vol. 25, No. 7, Jul. 2017, pp. 1450-1461.

* cited by examiner

ELECTRONIC APPARATUS AND CONTROLLING METHOD THEREFOR

TECHNICAL FIELD

The disclosure relates to an electronic apparatus and a controlling method therefor, and more particularly to an electronic apparatus for determining whether a received user's speech is completed and a controlling method therefor.

BACKGROUND ART

Along with the development of speech recognition technologies, there is an increasing number of electronic apparatuses with a speech recognition technology. The electronic apparatuses with the speech recognition technology receive an input of a speech command uttered by a user and perform a function according to a user's speech.

In order that the electronic apparatuses perform the function according to the user's speech properly, the electronic apparatuses need to receive a completed user's speech.

In the related art, in order to receive a completed user's speech, a button release method in which a user utters while pressing a button of an electronic apparatus, a timeout method in which it is determined that utterance is completed, if there is no utterance of user for a certain period of time, and the like have been used.

In such methods of the related art, if the user fails to press the button during the utterance or the user stops the utterance temporarily and the utterance in complete form is not input for a predetermined certain period of time, the electronic apparatus performs speech recognition with respect to the utterance input before the user fails to press the button or the utterance input for a predetermined certain period of time. In such cases, an error of a speech recognition result is highly likely to occur, since the user did not complete the utterance, and thus, it is inconvenient that the user has to perform the same utterance again.

DISCLOSURE

Technical Problem

The disclosure is made in view of the aforementioned problems and an object of the disclosure is to provide an electronic apparatus for determining whether a user's speech is completed based on meaning of a speech uttered by a user and a method for controlling the same.

Technical Solution

According to an embodiment of the disclosure, there is provided an electronic apparatus including: a memory configured to store a first model and a second model; and a processor configured to generate a response to a received user's speech in response to whether the user's speech is completed determined based on the first model and the second model, in which the first model is a model that uses sentence structures of a plurality of completed sentences as learning data, and the second model is a model that uses a plurality of completed sentences and intents corresponding to the plurality of completed sentences as learning data.

The sentence structure may be determined based on a part of speech of at least one element configuring each of the plurality of completed sentences, and the first model may be a model trained based on the part of speech of the at least one element so as to determine whether the user's speech is completed according to a part of speech of an element configuring the user's speech.

The second model may be a model trained based on a part of speech of an element configuring a completed sentence by intent so as to determine whether the user's speech is completed according to an intent of the user's speech and a part of speech of an element configuring the user's speech.

The first model and the second model may be trained using the learning data according to a context, and the processor may be configured to determine whether the user's speech is completed according to the context by using the first model and the second model.

The processor may be configured to obtain information indicating whether the user's speech is a completed sentence from the first model and the second model, respectively, by using information obtained from the user's speech as input data of the first model and the second model, and determine whether the user's speech is completed based on the information obtained from the first model and the second model, respectively.

The processor may be configured to, based on the user's speech being determined as a completed sentence based on the information obtained from the first model and the second model, respectively, and the user's speech not corresponding to a predetermined exception sentence, determine that the user's speech is completed.

The processor may be configured to convert the user's speech into a text and obtain information regarding an intent of the user's speech and a part of speech of an element configuring the user's speech based on the text.

The processor may be configured to obtain a first output value corresponding to whether a sentence of the user's speech is completed by using a part of speech of a sentence component configuring the user's speech as input data of the first model, obtain a second output value corresponding to whether a sentence of the user's speech is completed by using the intent of the user's speech and the part of speech of the sentence component configuring the user's speech as input data of the second model, and determine whether the user's speech is completed based on the first output value and the second output value.

The processor may be configured to apply a first predetermined weight to the first output value, apply a second predetermined weight to the second output value, add up the first output value applied with the first weight and the second output value applied with the second weight, and determine whether the user's speech is completed based on the added value.

The processor may be configured to, based on the added value being a predetermined value or more and the user's speech not corresponding to a predetermined exception sentence, determine that the user's speech is completed.

According to another embodiment of the disclosure, there is provided a method for controlling an electronic apparatus, the method including: receiving a user's speech; determining whether the user's speech is completed by using first and second models; and providing a response to the user's speech in response to whether the received user's speech is completed determined based on the first model and the second model.

The first model may be a model that uses sentence structures of a plurality of completed sentences as learning data, and the second model may be a model that uses a plurality of completed sentences and intents corresponding to the plurality of completed sentences as learning data.

The sentence structure may be determined based on a part of speech of at least one element configuring each of the plurality of completed sentences, and the first model may be a model trained based on the part of speech of the at least one element so as to determine whether the user's speech is completed according to a part of speech of an element configuring the user's speech.

The second model may be a model trained based on a part of speech of an element configuring a completed sentence by intent so as to determine whether the user's speech is completed according to an intent of the user's speech and a part of speech of an element configuring the user's speech.

The first model and the second model may be trained using the learning data according to a context, and the determining may include determining whether the user's speech is completed according to the context by using the first model and the second model.

The control method may further include: obtaining information indicating whether the user's speech is a completed sentence by using information obtained from the user's speech as input data of the first model and the second model, and the determining may include determining whether the user's speech is completed based on the information obtained from the first model and the second model, respectively.

The determining may include, based on the user's speech being determined as a completed form based on the information obtained from the first model and the second model, respectively, and the user's speech not corresponding to a predetermined exception sentence, determining that the user's speech is completed.

The control method may further include converting the user's speech into a text and obtaining information regarding an intent of the user's speech and a part of speech of an element included in the user's speech based on the text.

The determining may include obtaining a first output value corresponding to whether a sentence of the user's speech is completed by using a part of speech of a sentence component configuring the user's speech as input data of the first model, obtaining a second output value corresponding to whether a sentence of the user's speech is completed by using the intent of the user's speech and the part of speech of the sentence component configuring the user's speech as input data of the second model, and determining whether the user's speech is completed based on the first output value and the second output value.

The determining may include applying a first predetermined weight to the first output value, applying a second predetermined weight to the second output value, adding up the first output value applied with the first weight and the second output value applied with the second weight, and determining whether the user's speech is completed based on the added value.

The determining may include, based on the added value being a predetermined value or more and the user's speech not corresponding to a predetermined exception sentence, determining that the user's speech is completed.

Effect of Invention

According to the various embodiments of the disclosure described above, by determining that the user's speech is not yet completed based on the meaning of the speech uttered by the user, the user does not need to repeatedly utter the content uttered previously, and accordingly, user's convenience is enhanced.

BEST MODE

Detailed Description of Exemplary Embodiments

Figure 1A:
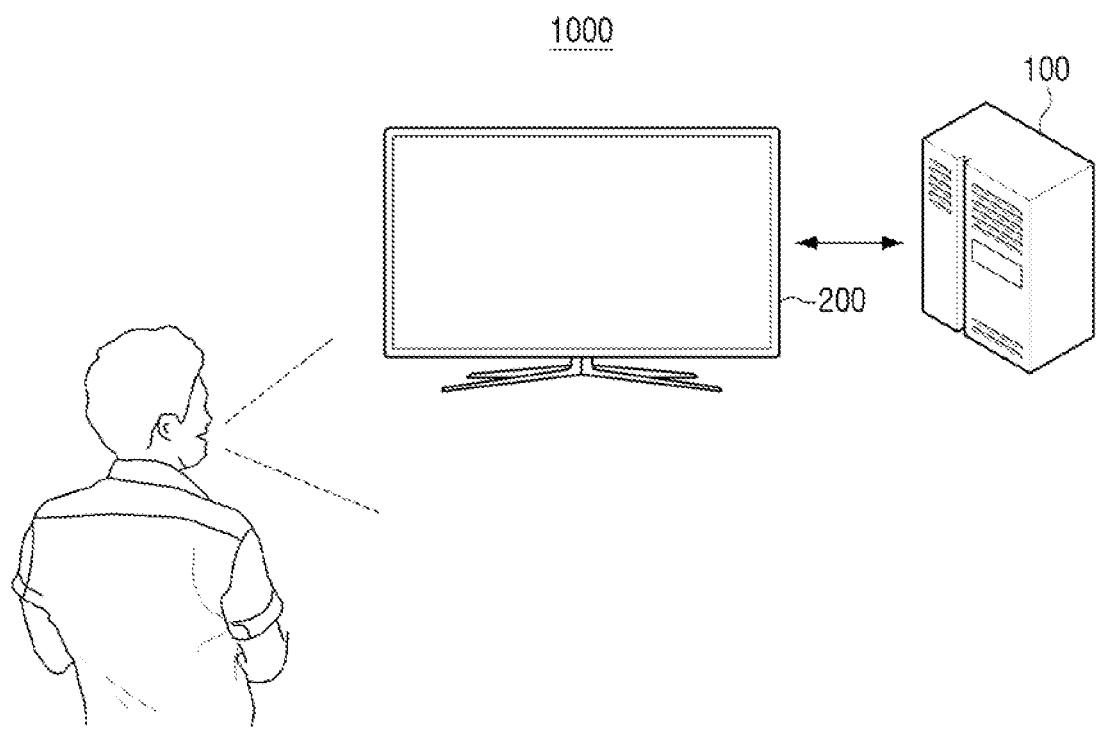
FIGS. 1A-1C are diagrams illustrating a system including an electronic apparatus according to various embodiments.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

Hereinafter, with reference to the accompanying drawings, embodiments of the disclosure will be described in detail for those skilled in the art to easily practice the embodiments.

But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Hereinafter, various embodiments of the disclosure will be described in detail with reference to the drawings.

Figure 1B:
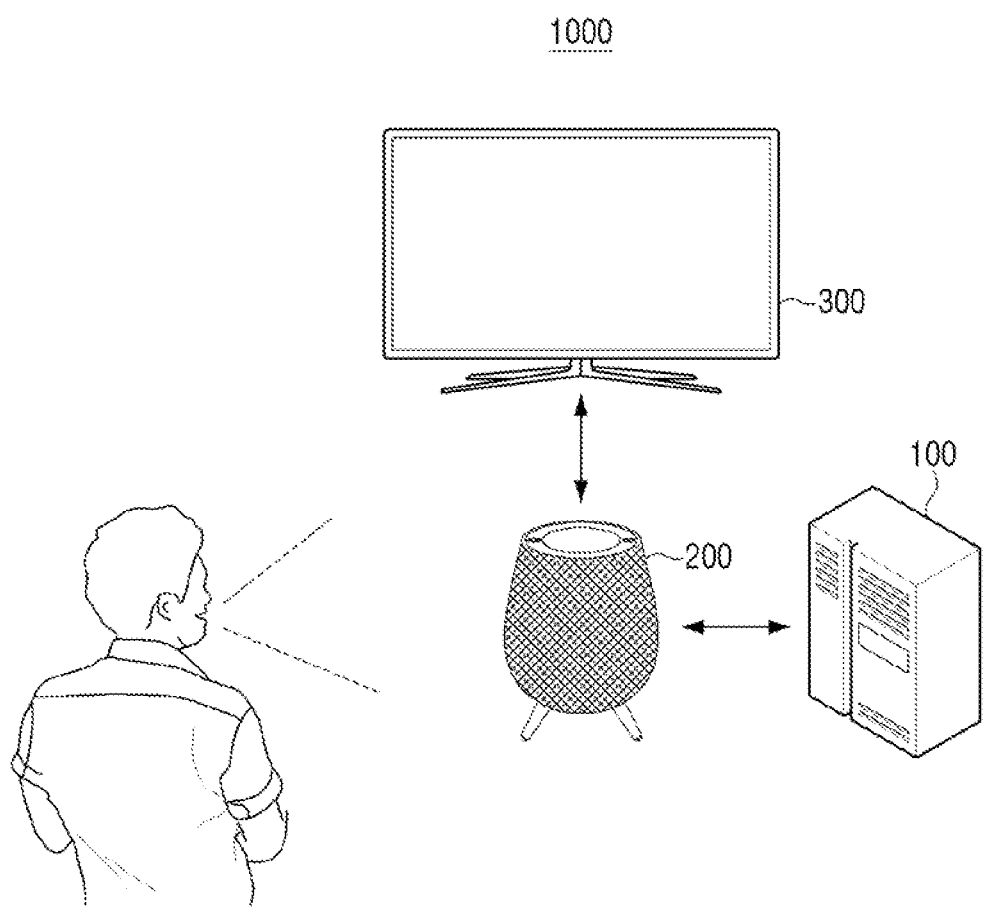
Figure 1C:
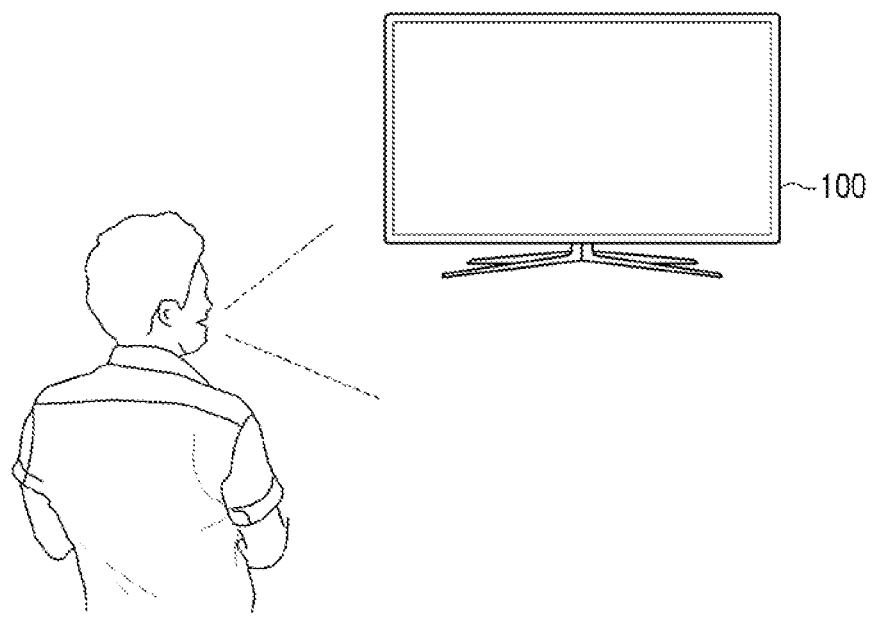

FIGS. 1A-1C are diagrams illustrating a system including an electronic apparatus according to various embodiments.

Referring to FIG. 1A, a system 1000 may include an electronic apparatus 100 and an external electronic apparatus 200.

The external electronic apparatus 200 may receive a user's speech. For this, the external electronic apparatus 200 may include a microphone. When a user speech signal is received, the external electronic apparatus 200 may transmit the received user speech signal to the electronic apparatus 100 and receive response information to the user speech signal from the electronic apparatus 100.

For this, the electronic apparatus 100 may include a dialogue system for providing a response to a user's speech using an artificial intelligence model.

Specifically, when the user speech signal is received, the electronic apparatus 100 may perform preprocessing of the user speech signal, perform speech recognition of the user speech signal to convert the user's speech into a text (speech to text (STT)), and grasp an intent and an entity of the user's speech based on a speech recognition result. In addition, the electronic apparatus 100 may obtain information for the response to the user's speech based on a natural language understanding result, for example, from a web server or the like, and obtain a natural language as the response information to the user's speech based on the obtained information. The electronic apparatus 100 may transmit the response information to the external electronic apparatus 200.

For this, the electronic apparatus 100 may include an automatic speech recognition (ASR) module, a natural language understanding (NLU) module, a dialogue management (DM) module, a natural language generation (NLG) module, and the like.

Meanwhile, the electronic apparatus 100 may include only some of the above modules. For example, the electronic apparatus 100 may include only the automatic speech recognition module and perform only a function of converting a user's speech into a text (speech to text (STT)). In this case, the electronic apparatus 100 may convert the user's speech into a text and transmit the converted text to another electronic apparatus (not illustrated) for performing natural language processing or the like. In addition, a natural language processing result may be received from the other electronic apparatus (not illustrated).

The electronic apparatus 100 may generate a response to the user's speech and transmit this to the external electronic apparatus 200. In addition, the external electronic apparatus 200 may provide the response to the user's speech.

For example, the external electronic apparatus 200 may covert the received response information into a speech through a text-to-speech (TTS) technology and output the speech via a speaker of the external electronic apparatus 200 or display a user interface including the corresponding text via a display of the external electronic apparatus 200.

Accordingly, the dialogue system may provide the response to the user's speech and therefore, the user may perform the dialogue with the external electronic apparatus 200.

Meanwhile, the electronic apparatus 100 may store an artificial intelligence agent for operating a dialogue system. Specifically, the electronic apparatus 100 may use the artificial intelligence agent for generating the natural language as the response to the user's speech. The artificial intelligence agent is a dedicated program for providing artificial intelligence (AI)-based services (e.g., speech recognition service, assistant service, translation service, search service, and the like), and may perform a generic-purpose processor of the related art (e.g., CPU) or a separate AI-dedicated processor (e.g., GPU). In particular, the artificial intelligence agent may control various modules.

Meanwhile, in FIG. 1A, it is described that that the external electronic apparatus 200 provides the response to the user's speech, but this is merely an example.

In other words, as illustrated in FIG. 1B, the external electronic apparatus 200 may provide the response to the user's speech via another external electronic apparatus 300 connected thereto.

Specifically, when the response information is received from the electronic apparatus 100, the external electronic apparatus 200 may transmit the received response information to the external electronic apparatus 300.

Accordingly, the external electronic apparatus 300 may output the response to the user's speech via a speaker or a display of the external electronic apparatus 300 using the received response information.

Meanwhile, in FIGS. 1A and 1B, it is described that the electronic apparatus 100 is implemented as a server, but this is merely an example.

In other words, as illustrated in FIG. 1C, the electronic apparatus 100 may receive the user's speech, perform the user recognition of the received speech, and provide the response to the user's speech.

In other words, when the user's speech is received, the electronic apparatus 100 may preprocess the user's speech and convert the user's speech into a user speech signal. Then, the electronic apparatus 100 may convert the user's speech into a text using the automatic speech recognition module, analyze an intent of the user's speech using the natural language understanding module, and generate the response to the user's speech via the natural language generation module. In addition, the electronic apparatus 100 may output and provide the generated response to the user.

Meanwhile, FIG. 1C illustrates that the electronic apparatus 100 is a TV, but this is merely an example, and the electronic apparatus 100 may be implemented as various types of electronic apparatuses. For example, the electronic apparatus 100 may be implemented as a smartphone including a display, a speaker, and the like, a speaker, a monitor, an air conditioner, a refrigerator, and the like.

In addition, in FIGS. 1A to 1C, it is described that the external electronic apparatus 200 receives the user's speech, but this is merely an example. For example, the external electronic apparatus 200 may receive a user's speech obtained by a remote control device (e.g., remote control or the like). In this case, the remote control device (not illustrated) may include a microphone in order to receive the user's speech.

The remote control device (not illustrated) which received the user's speech may convert the received user's speech (analogue signal) into a digital signal and transmit the converted digital signal to the external electronic apparatus 200 via infrared communication, wireless communication such as Bluetooth or Wi-Fi. In other words, the remote control device (not illustrated) may include a communicator (not illustrated) for communicating with the external electronic apparatus 200 and the external electronic apparatus 200 may include a communicator for communicating with the remote control device. The external electronic apparatus 200 may include a plurality of communicators such as a communicator (e.g., Bluetooth module) for communicating with the remote control device (not illustrated), a communicator (e.g., Ethernet modem, Wi-Fi module, and the like) for communicating with a server (not illustrated) or another electronic apparatus (not illustrated), and the like. However, this is merely an embodiment, and the electronic apparatus 100 may communicate with the remote control device (not illustrated), the server (not illustrated), and the other electronic apparatus (not illustrated) using one communicator including a Wi-Fi module.

The remote control device (not illustrated) may be implemented as a remote controller, a mobile device such as a smartphone, a wearable device such as a smart watch, a pointing device, and the like. In particular, an application for controlling the external electronic apparatus 200 may be installed on the remote control device (not illustrated) to control the external electronic apparatus 200.

Meanwhile, as the user's speech is in a completed form, a degree of natural language understanding regarding the user's speech increases, and accordingly, it is necessary that the user's speech is in a completed form, in order that the electronic apparatus 100 generates accurate response information to the user's speech.

For this, the electronic apparatus 100 according to an embodiment of the disclosure may determine whether the received user's speech is completed.

Specifically, the electronic apparatus 100 may generate the response to the user's speech in response to the completed state of the received user's speech determined based on a first model and a second model. The first model is a model that uses sentence structures of a plurality of completed sentences as learning data, and the second model is a model that uses a plurality of completed sentences and intents corresponding to the plurality of completed sentences as learning data.

Accordingly, according to the various embodiments of the disclosure, since the first model and the second model that use the sentence structure of the completed sentence, the completed sentence, and the user's intent as learning data are used, it is possible to determine whether the user's speech is completed only with the sentence structure of the user's speech or the user's intent, without a separate constituent element (e.g., button or timer), thereby providing appropriate response information to the user's speech.

Figure 2:
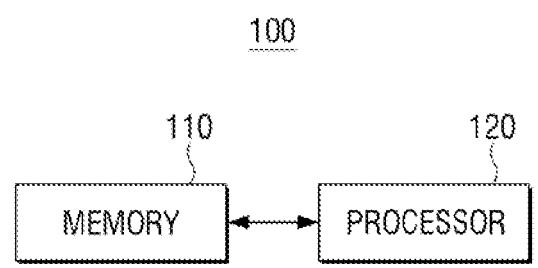
FIG. 2 is a block diagram illustrating a configuration of an electronic apparatus according to an embodiment.

FIG. 2 is a block diagram illustrating a configuration of an electronic apparatus according to an embodiment.

As illustrated in FIG. 2, the electronic apparatus 100 may include a memory 110 and a processor 120.

The memory 110 may be a constituent element for storing various programs and data necessary for operations of the electronic apparatus 100.

The memory 110 may include an automatic speech recognition module, a natural language understanding module, a dialogue management module, a natural language generation module, and a TTS module, in order for the speech recognition of the user speech signal received by the electronic apparatus 100.

In addition, the memory 110 may store the first model and the second model.

In this case, the processor 120 may determine whether the user's speech is in a completed form using the first and second models, and these models will be described later in detail with reference to FIG. 3.

The processor 120 may control general operations of the electronic apparatus 100.

Specifically, the processor 120 may perform the speech recognition of the user's speech, and generate response information of the user's speech based on the speech recognition result.

In this case, when the user's speech is received, the processor 120 may convert the user's speech into a text by performing the speech recognition of the user's speech, and grasp the intent and the entity of the user's speech based on the speech recognition result. In addition, the processor 120 may obtain information for the response to the user's speech based on a natural language understanding result, for example, from a web server or a search engine, and obtain a natural language as the response information to the user's speech based on the obtained information.

In addition, the processor 120 may control the electronic apparatus 100 so as to provide the response to the user's speech based on the response information.

Specifically, the processor 120 may transmit the response information to the external electronic apparatus (e.g., external electronic apparatus 200 of FIGS. 1A and 1C) or output the response to the user's speech based on the response information via a speaker or a display of the electronic apparatus 100.

Meanwhile, the processor 120 may determine whether the user's speech is completed and generate response information to the user's speech based on the determined result.

Specifically, when the user's speech is received, the processor 120 may determine whether the user's speech is completed using the first model and the second model stored in the memory 110, and generate the response information to the user's speech based on the determined result.

In this case, the processor 120 may obtain the information regarding whether the user's speech is a completed sentence from each of the first model and the second model using the user's speech as input data of the first model and the second model, and determine whether the user's speech is completed based on the information obtained from the first model and the second model, respectively.

Accordingly, if the user's speech is completed, the processor 120 may generate the response information to the user's speech and provide a response to the user's speech based on the generated response information.

However, if the user's speech is not completed, the processor 120 may perform the speech recognition regarding the user's speech using a speech subsequently input together with the speech previously input and provide a response thereto, rather than generating the response information to the user's speech. In addition, if the user's speech does not correspond to the completed state, the processor 120 may provide response information for requesting re-utterance.

As described above, according to an embodiment of the disclosure, the electronic apparatus 100 may determine whether the user's speech is completed and provide the response to the user's speech according to the determined result. Accordingly, it is possible to enhance user's convenience, since the user may not utter the same sentence several times.

Meanwhile, hereinafter, a method for determining whether the user's speech is completed will be described in detail with reference to FIG. 3.

Figure 3:
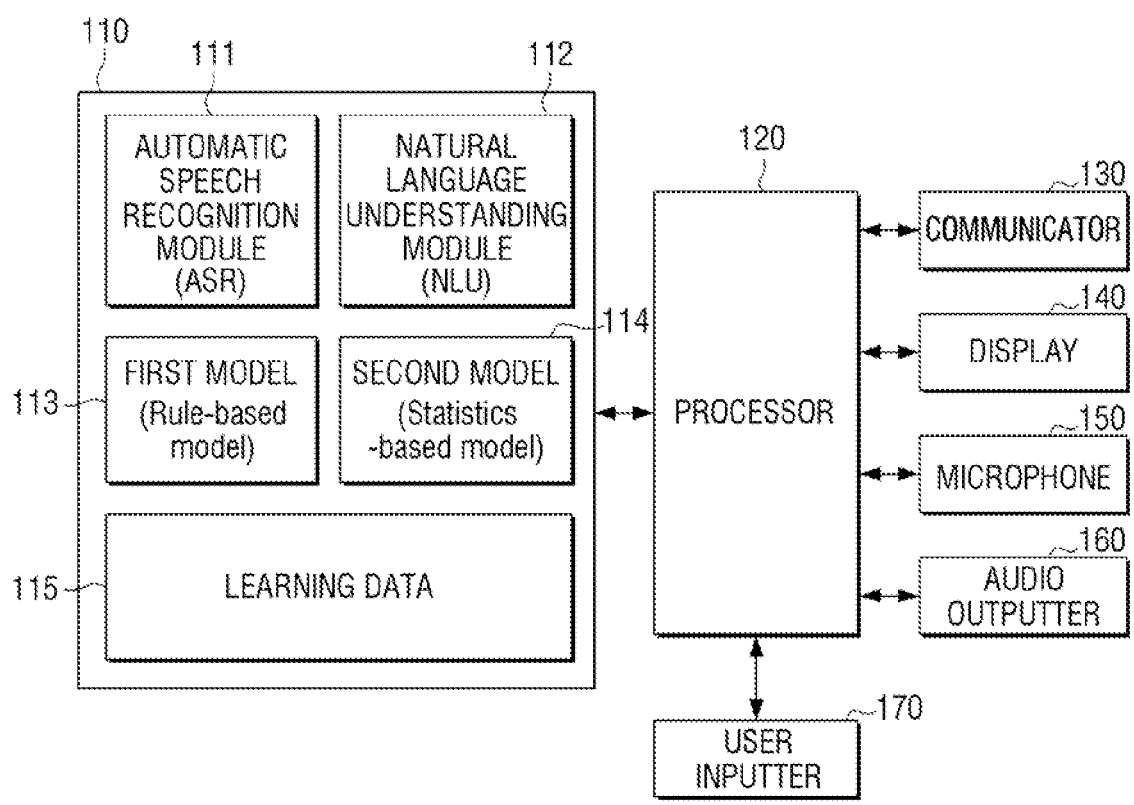
FIG. 3 is a block diagram specifically illustrating the configuration of the electronic apparatus according to an embodiment.

FIG. 3 is a block diagram specifically illustrating the configuration of the electronic apparatus according to an embodiment.

As illustrated in FIG. 3, the electronic apparatus 100 may include the memory 110, the processor 120, a communicator 130, a display 140, a microphone 150, an audio outputter 160, and a user inputter 170.

The memory 110 may store various programs and data necessary for operations of the electronic apparatus 100.

For this, the memory 110 may be implemented as a non-volatile memory, a volatile memory, a flash memory, a hard disk drive (HDD), or a solid-state drive (SSD). The memory 110 may be accessed by the processor 120 and reading, recording, editing, deleting, or updating of the data by the processor 120 may be executed. A term, memory, in the disclosure may include the memory 110, a ROM (not illustrated) and RAM (not illustrated) in the processor 120, or a memory card (not illustrated) (e.g., micro SD card or memory stick) mounted on the electronic apparatus 100.

Specifically, the memory 110 may include various modules configuring the dialogue system. For example, the memory 110 may include an automatic speech recognition module, a natural language understanding module, a dialogue management module, a natural language generation module, a TTS module, and the like.

An automatic speech recognition module 111 may perform speech recognition regarding the user's speech. Specifically, the automatic speech recognition module 111 may perform a function of converting a received user's speech into a text (speech to text (STT)).

A natural language understanding module 112 may grasp meaning and intent of the user's speech based on a speech recognition result. For this, the natural language understanding module 112 may convert informal language data included in the user's speech into formal language data that can be understood by the electronic apparatus through morphological analysis, syntactic analysis, meaning understanding analysis, and the like.

A dialogue management module (not illustrated) may obtain information for providing the response to the user's speech based on the natural language understanding result, for example, from an external server or the like. In addition, the natural language generation module may obtain natural language as response information to the user's speech based on the obtained information.

In addition, a TTS module (not illustrated) may convert the obtained natural language into a speech.

Meanwhile, in the above example, it is described that the modules are stored in the memory 110 as software, but this is merely an example, and the modules may be implemented as hardware chips.

In addition, the memory 110 may include a first model 113 and a second model 114. Herein, the first model 113 and the second model 114 may be artificial intelligence models trained using information regarding a completed sentence as input data.

For example, the first model 113 and the second model 114 may be models based on a neural network.

Specifically, the first model 113 and the second model 114 may be designed to simulate a brain structure of human on a computer and may include a plurality of network nodes including weights and simulating neurons of the neural network of human. The plurality of network nodes may form connections to each other to simulate a synaptic activity of neuron in that the neurons transmit and receive signals through synapse.

In addition, the first model 113 and the second model 114 may include, for example, a neural network model or a deep learning model developed from the neural network model. In a deep learning model, a plurality of network nodes may be positioned at depths (or on layers) different from each other and may transmit and receive data according to the convolution connection. Examples of the trained artificial intelligence model may include a deep neural network (DNN), a recurrent neural network (RNN), and a bidirectional recurrent deep neural network (BRDNN), but there is no limitation thereto.

First, the first model 113 may be a model trained using sentence structures of a plurality of completed sentences as learning data. The sentence structure may be determined based on a part of speech of at least one element configuring each of the plurality of completed sentences. Here, the element may include one or more words having a specific meaning in the sentence. For example, if a completed sentence is "Find out a romantic movie", the elements of the corresponding sentence may be "Find out", "romantic", and "movie". In addition, if the completed sentence is "Find out a Tom Cruise's movie", the elements of the sentence may be "Find out", "Tom Cruise's", and "movie".

In this case, the sentence structure of the completed sentence may be represented by part-of-speech tagging (POS tagging) regarding elements configuring the completed sentence. In other words, the part-of-speech tagging may refer to dividing the sentence into the unit of elements and tagging information of part of speech of each element, a context, a named entity, meaning information of the element, and the like in consideration of the meaning and the context of the element.

The information of the part of speech of the element may represent information regarding parts of speech of elements (e.g., noun, adjective, verb, and the like) included in the completed sentence, the context may represent a situation of a device to which the completed sentence including the elements is applied, the named entity may represent a proper name such as a name of a person, a place, an institute, and the like, and the meaning information may represent contextual meaning of the elements.

In this case, the first model 113 may be trained based on a part of speech of at least one element configuring each of the plurality of completed sentences so as to determine whether the user's speech is completed according to the parts of speech of the elements configuring the user's speech.

Specifically, the first model 113 may be trained through a structure of a part of speech of at least one element configuring the completed sentence.

For example, it is assumed that the first model 113 is trained through sentences in a completed form such as "Find out a romantic movie" and "Find out a Tom Cruise's movie".

In this case, the first model 113 may be trained using "Find out [ADJ:VIDEO:NE:MOOD] [NOUN:VIDEO:NE: GENRE]" representing the sentence structures of "Find out a romantic movie" and "Find out a Tom Cruise's movie" as learning data.

In [ADJ:VIDEO:NE:MOOD], "ADJ" may represent that the part of speech of the corresponding element is an adjective, "VIDEO" may represent that a completed sentence including the corresponding element may be used in a video search situation, "NE" may represent that the corresponding element is a named entity, and "MOOD" may represent that the corresponding element may be an element related to a mood. In other words, it may be considered that the corresponding element of [ADJ:VIDEO:NE:MOOD] may be an adjective, may be used in a video search situation, may be a named entity, and may represent an element related to a mood.

In addition, in [NOUN:VIDEO:NE:GENRE], "NOUN" may represent that a part of speech of the corresponding element is a noun, "VIDEO" may represent that a completed sentence including the corresponding element may be used in a video search situation, "NE" may represent that the corresponding element is a named entity, and "GENRE" may represent that the corresponding element is an element related to a genre. In other words, it may be considered that the corresponding element of [ADJ:VIDEO:NE:MOOD] may be a noun "movie", may be used in a video search situation, may be a named entity, and may represent an element related to a genre.

Accordingly, the first model 113 may be trained regarding that the completed sentence including "Find out" has a structure of the part of speech in which the "adjective" and the "noun" are disposed in sequence after "Find out", through the sentence structures such as "Find out [ADJ: VIDEO:NE:MOOD] [NOUN:VIDEO:NE:GENRE] of "Find out a romantic movie" and "Find out a Tom Cruise's movie".

Meanwhile, in the above example, it is described that the first model 113 is trained using the sentence structure in which the part of speech is only tagged to a part of element, rather than all of the elements of the completed sentence, but this is merely an embodiment.

In other words, the first model 113 may be trained through the part-of-speech tagging tagged to all elements of the completed sentence. For example, as in the above example, in the case of "Find out a romantic movie" and "Find out a Tom Cruise's movie", "[VERB:VIDEO:SEARCH] [ADJ: VIDEO:NE:MOOD] [NOUN:VIDEO:NE:GENRE]" may be represented. In this case, the first model 113 may be trained regarding that the completed sentence has a structure of parts of speech in which the "adjective" and "noun" are disposed in sequence after "verb".

Meanwhile, the first model 113 may be trained using leaning data according to the context.

The context herein may refer to a situation of a device to which the user's speech is applied.

For example, if a device (herein, the device may be the external electronic apparatus 200 in FIGS. 1A and 1B or the electronic apparatus 100 in FIG. 1C) is present in a video search situation, that is, if a user searches for a video through speech, the context may correspond to a video search context. In addition, if the user controls the function of the device (e.g., changing a channel of the device or changing a volume) through a speech, the context may include an apparatus control context. However, the video search context and the apparatus control context are merely an example and there may be various contexts according to situations of the device.

In this case, the first model 113 may be trained using a sentence structure of the plurality of completed sentences provided according to the context as learning data.

For example, the first model 113 may be trained regarding the video search context based on a sentence structure of a completed sentence "Find out a romantic movie". In a case of the video search context, the first model may be trained regarding that the completed sentence has a structure of a part of speech in which "adjective" and "verb" are disposed in sequence after "Find out". In addition, the first model 113 may be trained regarding the apparatus control context based on a sentence structure of a completed sentence "turn down volume" and may be trained regarding that the apparatus control context has a structure of a part of speech in which "verb" is disposed after "turn down".

In other words, the completed sentences used for each context may be different and sentence structures of the corresponding sentences may be different, and accordingly, in an embodiment of the disclosure, the first model 113 may learn the sentence structure of the completed sentence for each context.

As described above, the first model 113 may learn the sentence structure of the completed sentence based on the parts of speech of elements configuring various completed sentences.

Meanwhile, the second model 114 may be a model trained using a plurality of completed sentences (or corpora) and intents corresponding to the plurality of completed sentences as the learning data.

Specifically, the second model 114 may be trained based on the part of speech of the element configuring the completed sentence for each intent, so as to determine whether the user's speech is completed according to the intent of the user's speech and the part of speech of the element configuring the user's speech. In this case, information regarding the intents contained in the plurality of completed sentences may be obtained through the natural language understanding module 112.

For example, it is assumed that the plurality of completed sentences usable as the learning data are "Find out an action movie", "Find out a hero movie", "Find out American drama", "Find out Korean drama", and the like.

In this case, the second model 114 may be trained regarding that "Find out an action movie" has an intent of searching for an action movie, "Find out hero movie" has an intent of searching for a hero movie, "Find out Korean drama" has an intent of searching for a Korean drama, and "Find out American drama" has an intent of searching for an American drama through the natural language understanding module 112.

The second model 114 may be trained regarding that a sentence "Find out "A" movie" may be used with the intent of searching for a movie and at that time, an adjective or noun may be positioned at "A". In other words, the second model 114 may be trained that a sentence having elements of [verb] [adjective or noun] [noun] may be used with the intent of searching for a movie.

In the same manner, the second model 114 may be trained regarding that a sentence "Find out "A" drama" may be used with the intent of searching for a drama and at that time, an adjective may be positioned at "A". In other words, the second model 114 may be trained regarding that a sentence having elements of [verb] [adjective] [noun] may be used with the intent of searching for a drama.

Throughout such a training process, the second model 114 may be structured with a reference for determining whether the user's speech is a completed sentence.

Meanwhile, the second model 114 may be trained using learning data according to the context.

For example, the second model 114 may be trained to have a reference for determining whether the user's speech is completed using the plurality of completed sentences "Find out romantic movie", "Find out kids movie", "Find out hero movie", and the like regarding the "video search" context as the learning data.

The second model 114 may be trained regarding that "Find out romantic movie" is in a form of [verb] [adjective] [noun] and "Find out kids movie" is in a form of [verb] [noun] [noun] in the "video search" context.

The second model 114 may be trained regarding that the form of the completed sentence used in the "video search" environment may be statistically "[verb] [adjective] [noun]"

and "[verb] [noun] [noun]" and the intent of the completed sentence is to search for a drama or a movie.

As described above, in order to train the first and second models 113 and 114, the memory 110 may store learning data 115.

Specifically, the memory 110 may include sentence structure data of a completed sentence represented with part-of-speech tagging in order to train the first model 113 and may include a form of a completed sentence for training the second model 114.

In addition, learning data 115 may include sentence structure data of the completed sentence or completed sentence according to the context, and the processor 120 may determine whether the user's speech is completed according to the context using the first model and the second model.

Meanwhile, the learning data 115 may be updated. For example, the learning data 115 may be updated by reflecting a determined result regarding the input user's speech.

If a user's speech uttered by the user is "Find out a kids animation" and the second model 114 is not yet trained enough, a reference for determining whether the user's speech in a form of "Find out a kids animation" is completed may not be formed in the second model 114. Meanwhile, in the first model 113, a reference for determining whether the sentence structures "Find out [NOUN:VIDEO:NE:MOOD] [NOUN:VIDEO:NE:GENRE]" are completed sentences may be formed. In this case, since the user's speech "Find out kids animation" matches to the sentence structure "Find out [NOUN:VIDEO:NE:MOOD] [NOUN:VIDEO:NE:GENRE]", the first model 113 may determine that the user's speech is completed. In addition, the learning data 115 may be updated based on such determination result. In other words, "Find out a kids animation" determined as a completed form may be added to the learning data 115.

In this case, the intent of "Find out a kids animation" may be determined as an intent of searching for a kids animation and the context of "Find out a kids animation" may be determined to correspond to the "video search" context through natural language understanding, and accordingly, the sentence "Find out a kids animation" may be added to the "video search" context. In addition, the second model 114 may be retrained using the updated leaning data 115. Meanwhile, this is merely an embodiment, and the first model 113 may be retrained using the updated learning data 115 in some cases.

In this case, since the first model 113 or the second model 114 is retrained using the updated learning data 115, the determination reference of the first model 113 or the second model 114 may become clearer according to the updating of the learning data 115.

Meanwhile, FIG. 3 illustrates that the memory 110 stores the learning data, but this is merely an embodiment. In other words, the learning data may be stored in a separate storage space in the electronic apparatus 100 rather than the memory 110, or may be stored in a separate electronic apparatus (not illustrated) rather than the electronic apparatus 100.

The processor 120 may be electrically connected to the memory 110 to control general operations and functions of the electronic apparatus 100. For example, the processor 120 may operate an operating system or an application program to control hardware or software elements connected to the processor 120 and perform various data processing and operations. In addition, the processor 120 may load and process an instruction or data received from at least one of other elements on a volatile memory and store various pieces of data in a non-volatile memory.

For this, the processor 120 may be implemented as a dedicated processor (e.g., an embedded processor) for performing the corresponding operations or a generic-purpose processor (e.g., a CPU or an application processor) capable of performing the corresponding operations by executing one or more software programs stored in a memory device.

Meanwhile, the processor 120 may determine whether the user's speech is completed using the first model 113 and the second model 114.

Specifically, the processor 120 may obtain information regarding whether the user's speech is a completed sentence from each of the first model 113 and the second model 114 using information obtained from the user's speech as input data of the first model 113 and the second model 114, and determine whether the user's speech is completed based on the information obtained from each of the first model 113 and the second model 114.

Figure 4:
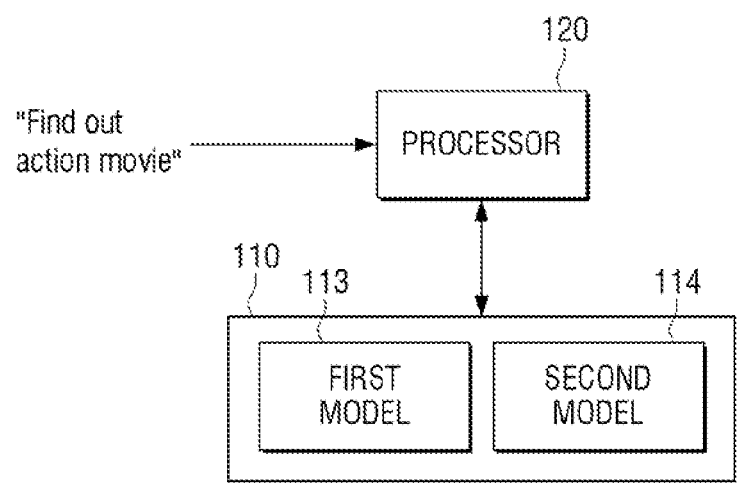
FIGS. 4 and 5 are diagrams illustrating the electronic apparatus according to an embodiment.

In relation to this, FIG. 4 is a diagram illustrating a method for determining whether an input user's speech is completed, if "Find out an action movie" is input.

When the user's speech is input, the processor 120 may convert the user's speech into a text by performing the speech recognition regarding the user's speech, and determine an intent of the user's speech and a part of speech of a sentence component configuring the user's speech based on the text.

For example, when the user's speech "Find out an action movie" is input, the processor 120 may perform the speech recognition regarding "Find out an action movie" using the automatic speech recognition module 111 and the natural language understanding module 112. As a result, the processor 120 may convert the user's speech "Find out an action movie" into the text "Find out an action movie" and obtain information indicating that the received user's speech includes "[verb] [noun] [noun]" and the user's speech has an intent of searching for an action movie based on the text. In addition, the processor 120 may obtain that the context of the user's speech is "video search" using the intent contained in the user's speech.

The processor 120 may obtain a first output value corresponding to whether a sentence of a user's speech is completed by using parts of speech of sentence components configuring the user's speech as input data of the first model 113, and obtain a second output value corresponding to whether the sentence of the user's speech is completed by using an intent of the user's speech and the parts of speech of sentence components configuring the user's speech as input data of the second model 114. The processor 120 may determine whether the user's speech is completed based on the first output value and the second output value.

Specifically, the processor 120 may determine whether information of parts of speech of the user's speech coincides with the information of parts of speech included in the trained sentence structure of the completed sentence by using the first model 113 and determine whether the user's speech is completed accordingly.

Here, the first model 113 may output the first output value corresponding to whether the sentence of the user's speech is completed, by comparing the trained result of the sentence structure of the completed sentence with the parts of speech of the elements configuring the user's speech. If the arrangement of the parts of speech included in the completed sentence trained based on the sentence structure of the completed sentence coincides with the arrangement of parts of speech of the user's speech, the first model 113 may obtain a reference for determining that the user's speech is in a completed form. In contrast, if the arrangement of parts of speech included in the user's speech does not coincide with the arrangement of parts of speech of the trained completed sentence, the first model 113 may obtain a reference for determining that the user's speech is not completed.

In other words, the first model 113 may output a value of 1 or 0 regarding the input user's speech, since the first model 113 may obtain a reference for determining whether the user's speech is completed by matching the arrangement of parts of speech included in the user's speech to the arrangement of the parts of speech of the trained completed sentence one on one.

For example, if the first model 113 is trained regarding that a sentence in a form in which "noun" and "noun" are disposed after "Find out" is a completed sentence, the first model 113 may obtain a reference for determining that the arrangement of parts of speech "Find out [noun][noun]" of the user's speech "Find out an action movie" coincides with "Find out [noun][noun]" of the trained completed sentence.

Therefore, the processor 120 may obtain a value of 1 representing that the user's speech is in a completed from the first model 113.

The processor 120 may determine whether the information of parts of speech of the user's speech coincides with the information of parts of speech of the trained completed sentence by using the second model 114 and determine whether the user's speech is completed accordingly.

The second model 114 may output the second output value corresponding to whether the sentence of the user's speech is completed by comparing the trained result of the completed sentence with the parts of speech of elements configuring the user's speech. The second model 114 may output a value between 0 and 1, since the second model 114 is a model statistically trained using the plurality of completed sentences as learning data.

If the second model 114 is trained regarding that a sentence including "[verb][noun][noun]" in the "video search" context is highly likely to be in a completed form, the second model 114 may obtain a reference for determining that "find out" of the user's speech "Find out an action movie" matches to [noun] and "action" and "movie" match to [noun] and [noun], respectively. The second model 114 may output a value between 0 and 1 according to the determined possibility.

The processor 120 may determine whether the user's speech is completed based on the first output value and the second output value obtained from the first model 113 and the second model 114.

If it is assumed that, when the sum of the first output value and the second output value is 1.65 or more, the processor 120 determines that the user's speech is complete, the first model 113 outputs 1, and the second model 114 outputs 0.8, the sum, 1.8, of the first output value, 1, of the first model 113 and the second output value, 0.8, of the second model 114 is larger than 1.65. In this case, the processor 120 may determine that the user's speech is completed.

Meanwhile, the processor 120 may obtain the output values from the first and second models 113 and 114 and then perform an exception process additionally.

Specifically, if the sum of the first output value and the second output value obtained from the first model and the second model is a predetermined threshold value or more and the user's speech does not correspond to a predetermined exception sentence, the processor 120 may determine that the user's speech is completed. However, if the user's speech corresponds to the predetermined exception sentence, the processor 120 may determine that the user's speech does not correspond to a completed form.

For this, the memory 110 may store exception sentences in advance and the processor 120 may determine whether the user's speech corresponds to the pre-stored exception sentence and determine whether the user's speech is completed.

In another embodiment, the processor 120 may determine whether the user's speech is completed by applying different weights to the first model 113 and the second model 114.

Specifically, the processor 120 may apply a first predetermined weight to the first output value and a second predetermined weight to the second output value, add up the first output value applied with the first weight and the second output value applied with the second weight, and determine whether the user's speech is completed based on the added value.

More specifically, if the added value is a predetermined threshold value or more, the processor 120 may determine that the user's speech is completed.

It is assumed as described above, that, if the sum of the first output value and the second output value is 1.65 or more, the processor 120 determines that the user's speech is completed, the first model 113 outputs 1, and the second model 114 outputs 0.8. The processor 120 may apply a weight of 1.5 to the first model 113, apply a weight of 2 to the second model 114, obtain 1.5 as the first output of the first model 113 applied with the weight, and obtain 1.6 as a weight of the second model 114 applied with the weight. In this case, since the sum, 3.1, of the first output value, 1.5, and the second output value, 1.6, is larger than 1.65, the processor 120 may determine that the user's speech is completed.

Meanwhile, the processor 120 may also perform the exception process additionally, if different weights are applied to the first and second models 113 and 114. In other words, if the added value of the first output value of the first model and the second output value of the second model is the predetermined threshold value or more and the user's speech does not correspond to the predetermined exception sentence, the processor 120 may determine that the user's speech is completed.

When performing the exception process, the processor 120 may determine whether the user's speech is completed by applying different weights to the first model, the second model, and an exception process rule.

Returning to FIG. 3, the communicator 130 is a constituent element for performing the communication between the electronic apparatus 100 and an external electronic apparatus (not illustrated). The electronic apparatus 100 may receive a user speech signal from the external apparatus via the communicator 130.

For this, the communicator 130 may include various communication modules such as a wired communication module (not illustrated), a near field wireless communication module (not illustrated), a wireless communication module (not illustrated), and the like.

Here, the wired communication module may be a module for communicating with an external apparatus (not illustrated) by a wired communication method such as wired Ethernet. The near field wireless communication module may be a module for communicating with an external apparatus (not illustrated) in a short distance according to a near field wireless communication method such as Bluetooth (BT), Bluetooth low energy (BLE), Zigbee, and the like. In addition, the wireless communication module may be a module connected to an external network according to a wireless communication protocol such as Wi-Fi, IEEE, and the like to communicate with an external apparatus (not illustrated) and a speech recognition server (not illustrated). In addition, the wireless communication module may further include a mobile communication module accessed to a mobile communication network for communication according to various mobile communication standards such as 3rd generation (3G), 3rd generation partnership project (3GPP), long term evolution (LTE), LTE advanced (LTE-A), 5G Networks, and the like.

Meanwhile, the communicator 130 may communicate with not only the external electronic apparatus (not illustrated), but also a remote control device for controlling the external electronic apparatus (not illustrated), that is, a remote controller (not illustrated).

For example, the communicator 130 may communicate with the remote control device (not illustrated) according to the near field communication method such as Bluetooth or BLE to transmit and receive various pieces of data.

Meanwhile, in another embodiment, the electronic apparatus 100 may include an interface (not illustrated) which is connected to an external apparatus (not illustrated) to transmit and receive a video/audio signal. The interface may transmit/receive signals/data according to standards of a display port (DP), high definition multimedia interface (HDMI), consumer electronics control (HDMI-CEC), red green blue (RGB) cable, a universal serial bus (USB), a digital visual interface (DVI), Thunderbolt, a component, and the like, and may include at least one or more connector or terminal corresponding to the standards of these.

The display 140 may display image data processed by an image processor (not illustrated) on a display area (or display). The display area may refer to at least a part of the display 140 exposed to one surface of a housing of the electronic apparatus 100. The at least part of the display 140 may be coupled with at least one of a front surface area, a side surface area, and a rear surface area of the electronic apparatus 100 in a form of a flexible display. The flexible display may be bendable, foldable, or rollable without damage through a paper-thin and flexible substrate.

The microphone 150 may obtain first second user's speeches. The microphone 150 may generate an electric signal from a speech or a sound received from outside.

For this, the microphone may include various elements such as a microphone for collecting a user's speech in an analogue form, an amplification circuit for amplifying the collected user's speech, an A/D conversion circuit for sampling the amplified user's speech and converting it into a digital signal, a filter circuit for removing a noise component from the converted digital signal, and the like.

The microphone 150 may transmit the generated electric signal to the processor 120. The processor 120 may determine the meaning, the intent, and the like of the user's speech by performing speech recognition and natural language process with respect to the electric signal received from the microphone 150.

In particular, the microphone 150 may be provided inside the electronic apparatus 100, but this is merely an embodiment, and the microphone 150 may be electrically connected to the electronic apparatus 100 and provided outside.

The audio outputter 160 may output not only various pieces of audio data obtained by executing various processing such as decoding, amplification, or noise filtering by an audio processor (not illustrated), but also various alerts or voice messages. Particularly, the configuration for outputting the sound may be implemented as the speaker 160, but this is merely an embodiment, and the configuration may be implemented as an output terminal capable of outputting audio data.

The user inputter 170 may receive various user inputs and transmit the user inputs to the processor 120. The user inputter 170 may include, for example, a touch panel, a (digital) pen sensor, or a key. The touch panel may use, for example, at least one type of an electrostatic type, a pressure-sensitive type, an infrared type, or an ultrasonic type. In addition, the touch panel may further include a control circuit. The touch panel may further include a tactile layer and may provide tactile sensation to the user. The (digital) pen sensor may be, for example, a part of a touch panel or may include a separate sheet for recognition. The key may include, for example, a physical button, an optical key, or a keypad.

Meanwhile, according to the implementation example of the electronic apparatus 100, at least a part of the constituent elements of the electronic apparatus 100 illustrated in FIG. 3 may be omitted.

For example, if the electronic apparatus 100 is implemented as a server as illustrated in FIGS. 1A and 1B, the user's speech is received by the external electronic apparatus 200 and the response to the user's speech is also output from the external electronic apparatus 200, and accordingly, the display 140, the microphone 150, and the audio outputter 160 of FIG. 3 may be omitted.

Figure 5:
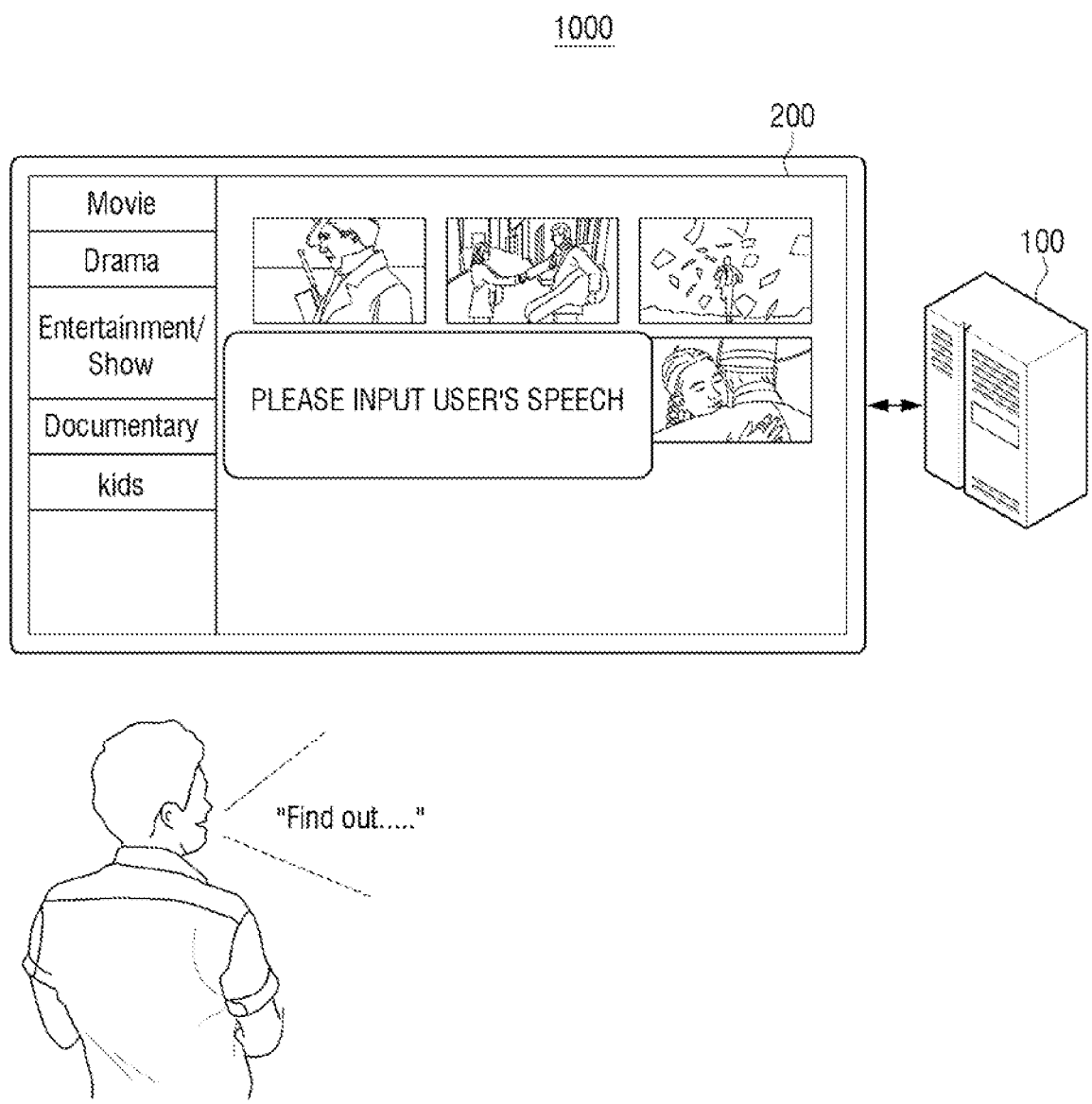

FIG. 5 is a diagram illustrating the electronic apparatus according to an embodiment.

Specifically, FIG. 5 is a diagram illustrating that, if the user utters a speech while the electronic apparatus 100 is connected to the external electronic apparatus 200, the processor 120 determines whether the user's speech is completed and the external electronic apparatus 200 performs an operation performed according to the determined result.

The external electronic apparatus 200 may receive a speech from a user. The user's speech may be input directly to the external electronic apparatus 200 or may be input to the external electronic apparatus 200 via another external electronic apparatus (e.g., remote controller or the like).

The external electronic apparatus 200 may display a UI for receiving a user's speech. Referring to FIG. 5, a text for requesting an input of a user's speech may be displayed or an image of a microphone or the like may be displayed.

The external electronic apparatus 200 which has received the user's speech may preprocess the user's speech to convert the user's speech into a user speech signal, and transmit the user speech signal to the electronic apparatus 100 using the wireless communication module.

As described above with reference to FIG. 4, the electronic apparatus 100 may determine whether the user's speech is completed using the first model 113 and the second model 114.

The external electronic apparatus 200 may determine whether to perform an operation according to user speech signal according to the determined result received from the electronic apparatus 100.

If the user utters "Find out an action movie" and the electronic apparatus 100 determines that the user's speech is completed, the electronic apparatus 100 may transmit the determined result to the external electronic apparatus 200.

When the information indicating that the user's speech is completed is received from the electronic apparatus 100, the external electronic apparatus 200 may execute a control command corresponding to the user's speech. For example, the external electronic apparatus 200 may perform a function of searching for an action movie according to the user speech command.

Meanwhile, in another embodiment, it is assumed that the user utters "Find out" and stops the utterance temporarily.

In this case, when the external electronic apparatus 200 receives a speech signal "Find out" and transmit this to the electronic apparatus 100, the electronic apparatus 100 may determine that the user's speech is not completed using the first model 113 and the second model 114.

The electronic apparatus 100 may transmit a signal indicating that the user's speech is not completed to the external electronic apparatus 200, and the external electronic apparatus 200 may continuously display a UI for requesting an input of a user's speech according to the signal received from the electronic apparatus 100. However, this is merely an embodiment, and the external electronic apparatus 200 which has received the information indicating that the user's speech is not completed from the electronic apparatus 100 may notify a user that the user's speech is not completed.

If the user's speech is input additionally, the electronic apparatus 100 may determine the user's speech additionally input after "Find out" as a sentence connected to "Find out" and determine whether the user's speech input after "Find out" and the user's speech including "Find out" are in a completed form.

As described above, since the electronic apparatus 100 determines whether the user's speech is completed and performs the operation corresponding to the user's speech only when the user's speech is completed, the inconvenience that the user has to complete utterance under certain conditions or within a certain period of time may be solved.

Figure 6:
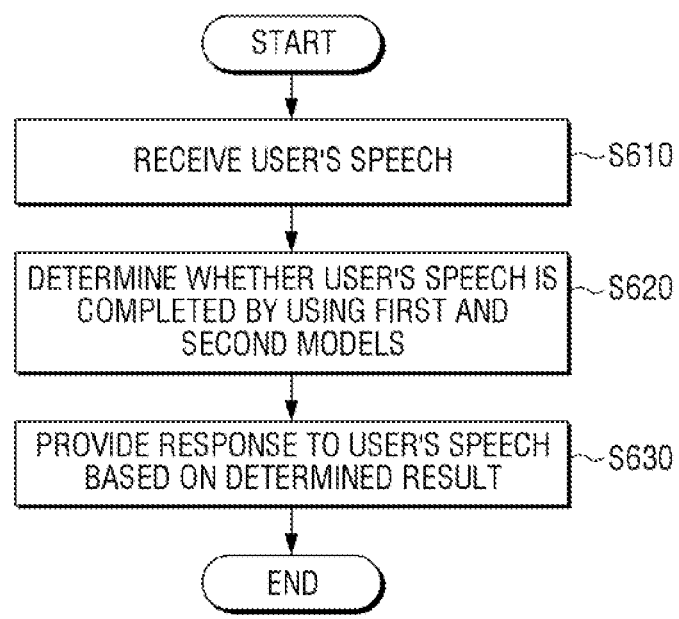
FIGS. 6 and 7 are flowcharts illustrating a method for controlling an electronic apparatus according to an embodiment.

FIG. 6 is a flowchart illustrating a method for controlling the electronic apparatus according to an embodiment.

First, the electronic apparatus 100 may receive a user's speech (S610). The electronic apparatus 100 may receive the user speech signal from the external electronic apparatus 200 or receive the user's speech directly from the user.

The electronic apparatus 100 may determine whether the user's speech is completed by using the first and second models (S620).

The first model may be a model that uses sentence structures of a plurality of completed sentences as learning data.

Specifically, the sentence structure may be determined based on a part of speech of at least one element configuring each of the plurality of completed sentences, and the first model may be a model trained based on the part of speech of the at least one element so as to determine whether the user's speech is completed according to the parts of speech of the element configuring the user's speech.

Meanwhile, the second model may be a model trained using the plurality of completed sentences and intents contained in the plurality of completed sentences as learning data.

Specifically, the second model may be a model trained based on parts of speech of elements configuring the completed sentence for each intent so as to determine whether the user's speech is completed according to the intent of the user's speech and the parts of speech of elements configuring the user's speech.

The first model and the second model may be trained using learning data according to the context.

The electronic apparatus 100 may determine whether the user's speech is completed according to the context using the first model and the second model.

Meanwhile, the electronic apparatus 100 may convert the user's speech into a text and obtain information regarding the intent of the user's speech and parts of speech of the elements included in the user's speech based on the text.

In addition, the electronic apparatus 100 may obtain information regarding whether user's speech is a completed sentence from each of the first model and the second model using the information obtained from the user's speech as input data of the first model and the second model, and determine whether the user's speech is completed based on the information obtained from the first model and the second model.

In this case, if it is determined that the user's speech is completed based on the information obtained from each of the first model and the second model and the user's speech does not correspond to the predetermined exception sentence, the electronic apparatus 100 may determine that the user's speech is completed.

The electronic apparatus 100 may generate a response to the user's speech in response to whether the received user's speech is completed determined based on the first model and the second model (S630).

Figure 7:
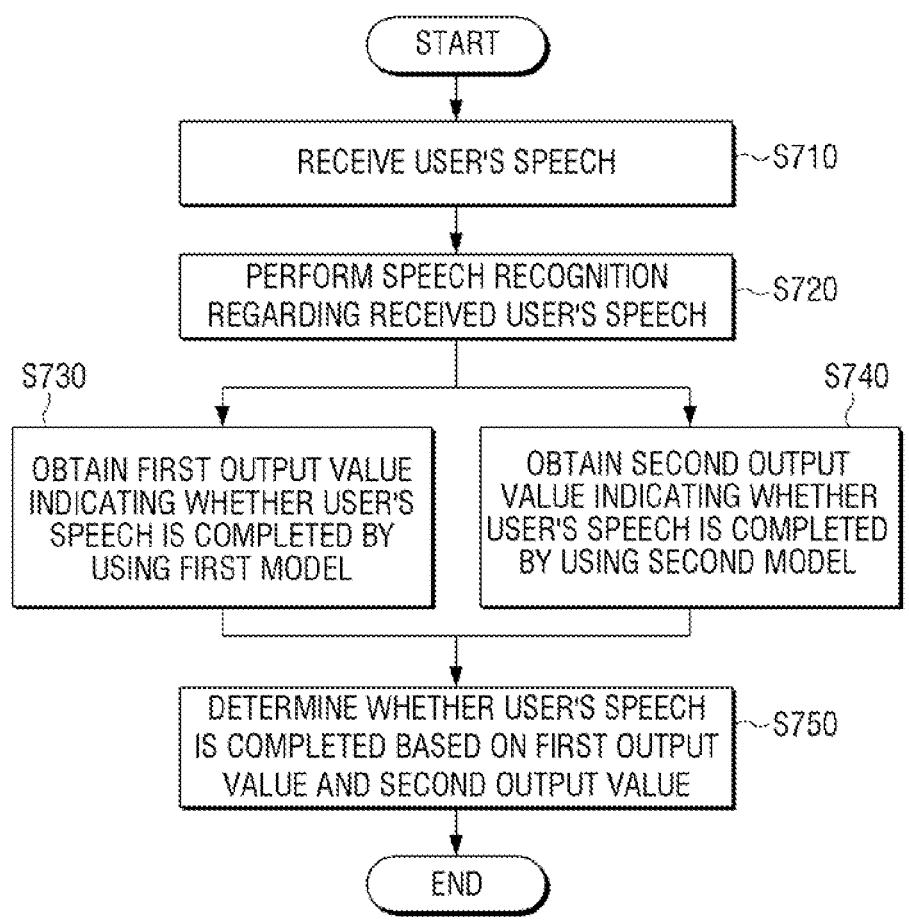

FIG. 7 is a flowchart illustrating a process in which the electronic apparatus determines whether the user's speech is completed according to an embodiment.

The electronic apparatus 100 may receive a user's speech (S710) and perform speech recognition regarding the received user's speech (S720). The electronic apparatus 100 may convert the user's speech into a text and determine the intent of the user's speech and parts of speech of sentence components configuring the user's speech based on the text.

The electronic apparatus 100 may obtain the first output value corresponding to whether the sentence of the user's speech is completed by using the first model 113 (S730). Specifically, the electronic apparatus 100 may obtain the first output value corresponding to whether the sentence of the user's speech is completed by using the parts of speech of sentence components configuring the user's speech as the input data of the first model 113.

In addition, the electronic apparatus 100 may obtain the second output value corresponding to whether the user's speech is completed by using the second model 114 (S740). Specifically, the electronic apparatus 100 may obtain the second output value corresponding to whether the sentence of the user's speech is completed by using the intent of the user's speech and the parts of speech of the sentence components configuring the user's speech as input data of the second model 114.

The electronic apparatus 100 may determine whether the user's speech is completed based on the first output value and the second output value (S750).

Specifically, the electronic apparatus 100 may apply the first predetermined weight to the first output value, apply the second predetermined weight to the second output value, add up the first output value applied with the first weight and the second output value applied with the second weight, and determine whether the user's speech is completed based on the added value.

More specifically, if the added value is a predetermined threshold value or more and the user's speech does not correspond to the predetermined exception sentence, the electronic apparatus 100 may determine that the user's speech is completed.

The various embodiments described above may be implemented in a recording medium readable by a computer or a similar device using software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In some cases, the embodiments described in the specification may be implemented as the processor 120 itself. According to the implementation in terms of software, the embodiments such as procedures and functions described in this specification may be implemented as separate software modules. Each of the software modules may perform one or more functions and operations described in this specification.

Computer instructions for executing processing operations of the electronic apparatus according to the embodiments of the disclosure descried above may be stored in a non-transitory computer-readable medium. When the computer instructions stored in such a non-transitory computer-readable medium are executed by the processor of a specific machine, the computer instructions may enable the specific machine to execute the processing operations of the electronic apparatus according to the embodiments described above.

INDUSTRIAL APPLICABILITY

-

SEQUENCE LIST FREE TEXT

-

What is claimed is:

1. An electronic apparatus comprising:
a memory configured to store a first model and a second model; and
a processor configured to generate a response to a received user's speech in response to whether the user's speech is completed determined based on the first model and the second model,
wherein the first model is a model that uses first sentence structures of a plurality of first completed sentences as first learning data, and
wherein the second model is a model that uses a plurality of second completed sentences and intents corresponding to the plurality of second completed sentences as second learning data.

2. The electronic apparatus according to claim 1, wherein a respective first sentence structure among the first sentence structures is determined based on a part of speech of at least one element configuring a respective plurality of first completed sentences among the plurality of first completed sentences, and
wherein the first model is a model trained based on the part of speech of the at least one element so as to determine whether the user's speech is completed according to a part of speech of an element configuring the user's speech.

3. The electronic apparatus according to claim 1, wherein the second model is a model trained based on a part of speech of an element configuring a completed sentence by intent so as to determine whether the user's speech is completed according to an intent of the user's speech and a part of speech of an element configuring the user's speech.

4. The electronic apparatus according to claim 1, wherein the first model and the second model are trained using respective learning data among the first learning data and the second learning data according to a context, and
wherein the processor is configured to determine whether the user's speech is completed according to the context by using the first model and the second model.

5. The electronic apparatus according to claim 1, wherein the processor is configured to obtain information indicating whether the user's speech is a completed sentence from the first model and the second model, respectively, by using information obtained from the user's speech as input data of the first model and the second model, and determine whether the user's speech is completed based on the information obtained from the first model and the second model, respectively.

6. The electronic apparatus according to claim 5, wherein the processor is configured to, based on the user's speech being determined as a completed sentence based on the information obtained from the first model and the second model, respectively, and the user's speech not corresponding to a predetermined exception sentence, determine that the user's speech is completed.

7. The electronic apparatus according to claim 1, wherein the processor is configured to convert the user's speech into a text and obtain information regarding an intent of the user's speech and a part of speech of an element configuring the user's speech based on the text.

8. The electronic apparatus according to claim 7, wherein the processor is configured to obtain a first output value corresponding to whether a sentence of the user's speech is completed by using a part of speech of a sentence component configuring the user's speech as input data of the first model, obtain a second output value corresponding to whether a sentence of the user's speech is completed by using the intent of the user's speech and the part of speech of the sentence component configuring the user's speech as input data of the second model, and determine whether the user's speech is completed based on the first output value and the second output value.

9. The electronic apparatus according to claim 8, wherein the processor is configured to apply a first predetermined weight to the first output value, apply a second predetermined weight to the second output value, add up the first output value applied with the first weight and the second output value applied with the second weight, and determine whether the user's speech is completed based on the added value.

10. The electronic apparatus according to claim 9, wherein the processor is configured to, based on the added value being a predetermined value or more and the user's speech not corresponding to a predetermined exception sentence, determine that the user's speech is completed.

11. A method for controlling an electronic apparatus, the method comprising:
receiving a user's speech;
determining whether the user's speech is completed by using first and second models; and
generating a response to the user's speech in response to whether the received user's speech is completed determined based on the first model and the second model,
wherein the first model is a model that uses first sentence structures of a plurality of first completed sentences as first learning data, and
wherein the second model is a model that uses a plurality of second completed sentences and intents corresponding to the plurality of second completed sentences as second learning data.

12. The method according to claim 11, wherein the first model and the second model are trained using respective learning data among the first learning data and the second learning data according to a context, and
  wherein the determining comprises determining whether the user's speech is completed according to the context by using the first model and the second model.

13. The method according to claim 11, further comprising:
  obtaining information indicating whether the user's speech is a completed sentence from the first model and the second model, respectively, by using information obtained from the user's speech as input data of the first model and the second model,
  wherein the determining comprises determining whether the user's speech is completed based on the information obtained from the first model and the second model, respectively.

14. The method according to claim 13, wherein the determining comprises, based on the user's speech being determined as a completed form based on the information obtained from the first model and the second model, respectively, and the user's speech not corresponding to a predetermined exception sentence, determining that the user's speech is completed.

15. The method according to claim 11, further comprising:
  converting the user's speech into a text and obtaining information regarding an intent of the user's speech and a part of speech of an element included in the user's speech based on the text.

* * * * *